United States Patent
Sims, III

[11] Patent Number: 6,115,346
[45] Date of Patent: Sep. 5, 2000

[54] METHOD OF REDUCING FORMATTING TIME FOR REWRITABLE COMPACT DISKS BY FORMATTING LESS THAN THE ENTIRE LOGICAL FORMAT

[75] Inventor: J Robert Sims, III, Fort Collins, Colo.

[73] Assignee: Hewlett-Packard Company, Palo Alto, Calif.

[21] Appl. No.: 09/409,773

[22] Filed: Sep. 30, 1999

Related U.S. Application Data

[62] Division of application No. 08/855,501, May 13, 1997, Pat. No. 6,009,058.

[51] Int. Cl.[7] .................................................. G11B 7/0045
[52] U.S. Cl. ..................... 369/111; 369/59; 369/124.07; 369/124.08
[58] Field of Search ............................. 369/44.26, 47–48, 369/50, 54, 58, 59, 111, 124.07–124.08; 714/701–702

[56] References Cited

U.S. PATENT DOCUMENTS

| | | |
|---|---|---|
| 4,757,393 | 7/1988 | Dakin et al. . |
| 5,058,096 | 10/1991 | Ando et al. . |
| 5,333,126 | 7/1994 | Fukuda et al. ............................. 369/59 |
| 5,559,778 | 9/1996 | Inokuchi et al. .......................... 369/58 |
| 5,596,565 | 1/1997 | Yonemitsu et al. . |
| 6,009,058 | 1/2000 | Sims, III et al. ......................... 369/54 |

OTHER PUBLICATIONS

Patent Abstracts of Japan, abstract for JP 9–171481, 1997.

*Primary Examiner*—W. R. Young
*Attorney, Agent, or Firm*—Augustus W. Winfield

[57] ABSTRACT

A method of formatting rewritable compact optical disks. In some example embodiments, a disk is initially partially formatted for immediate useability, and then additional incremental formatting is provided until the disk is completely formatted. The additional formatting may take place while a drive is off-line. In one embodiment, data is written to an unformatted disk with data writing and formatting taking place simultaneously. In various example embodiments, lead-in and lead-out areas may be written first with nothing in between or lead-in and lead-out areas may optionally written only if needed.

2 Claims, 12 Drawing Sheets

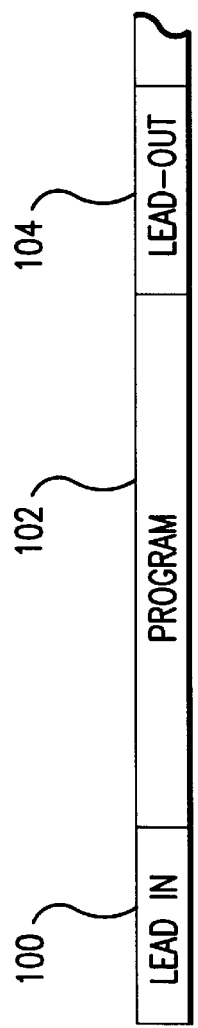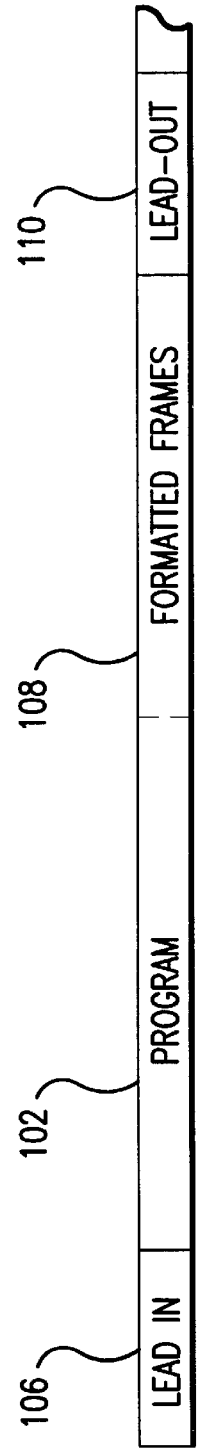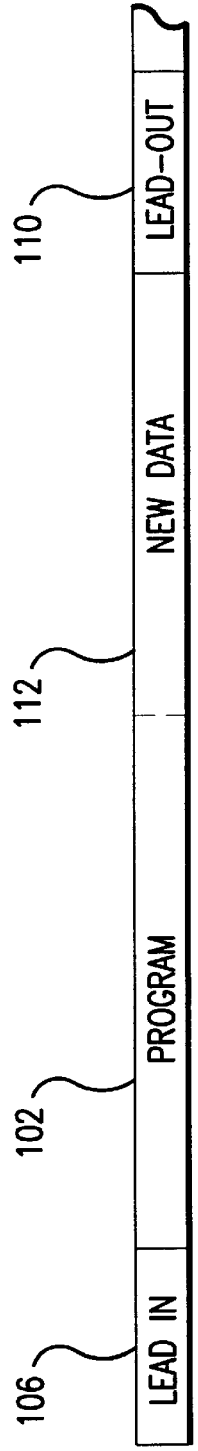

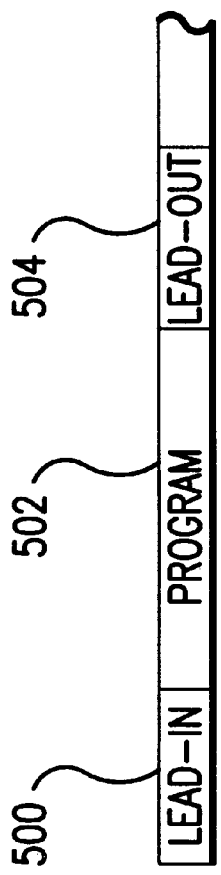
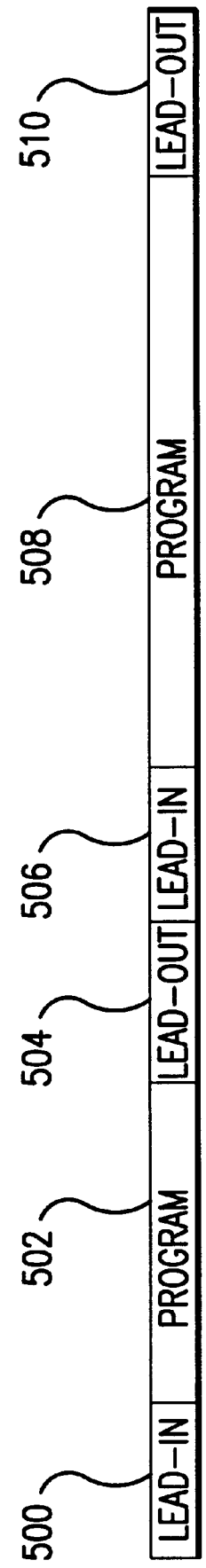
FIG.5A
FIG.5B

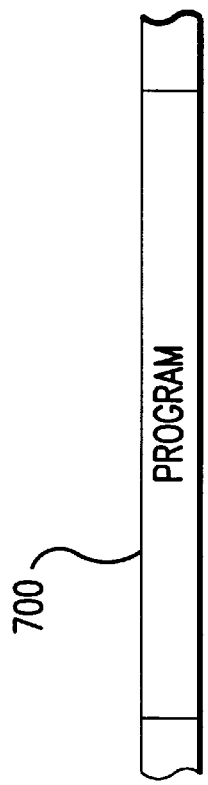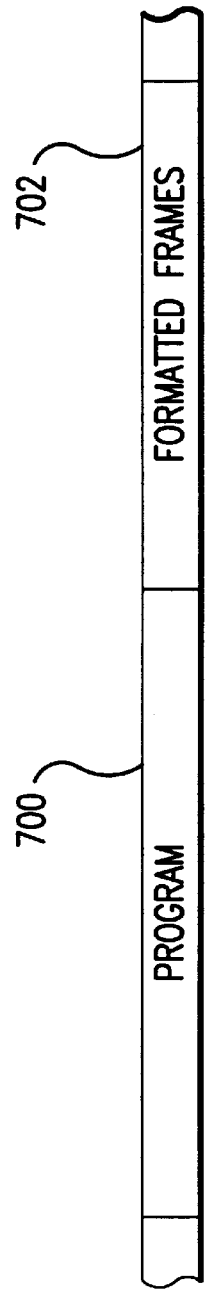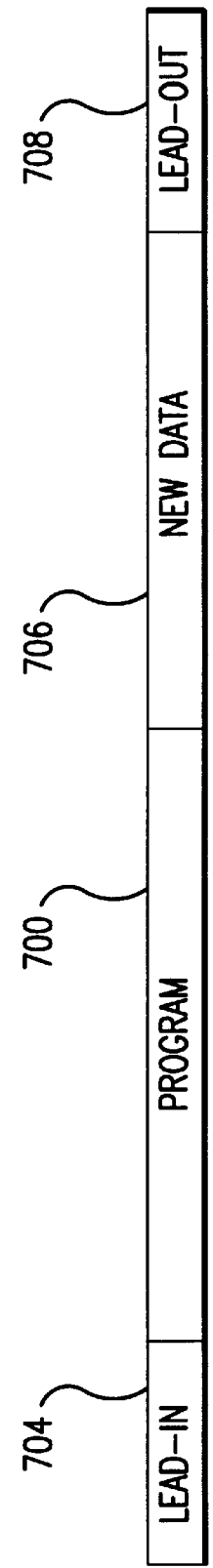

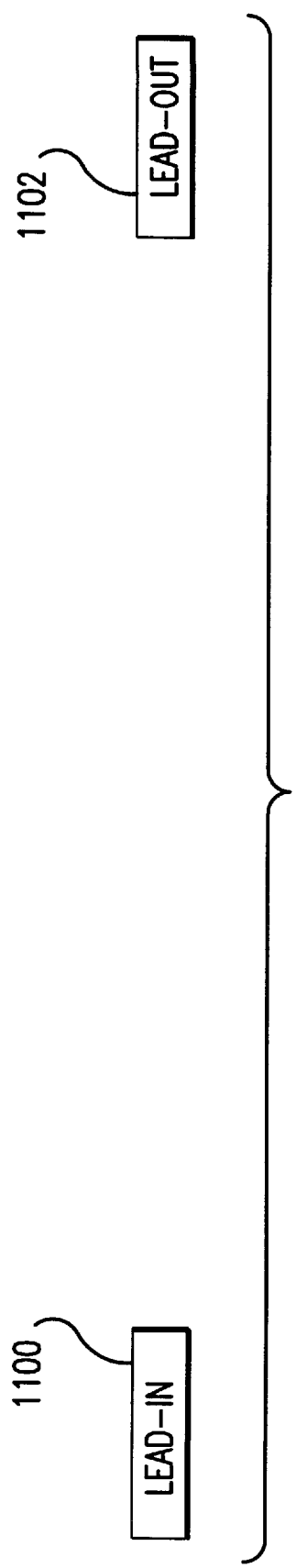
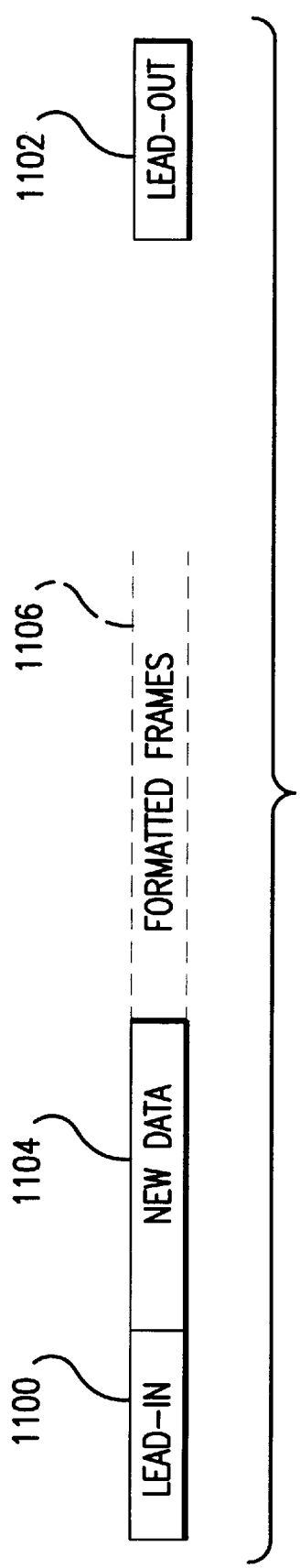

METHOD OF REDUCING FORMATTING TIME FOR REWRITABLE COMPACT DISKS BY FORMATTING LESS THAN THE ENTIRE LOGICAL FORMAT

CROSS REFERENCE TO RELATED APPLICATION

This is a divisional of application Ser. No. 08/855,501 filed on May 13, 1997, which is hereby incorporated by reference, now U.S. Pat. No. 6,009,058.

FIELD OF INVENTION

This invention relates generally to digital mass memory storage and more specifically to drives for compact optical disks.

BACKGROUND OF THE INVENTION

In 1981, Philips and Sony proposed physical standards and format standards for digital audio compact disks (CD-DA). Since then, disks complying with the same general physical specifications for audio compact disks have been introduced for general digital data storage and distribution. Data on the disks may be formatted in a variety of ways, including the original format for digital audio, a format for computer read-only-memory (CD-ROM) and special formats for interactive multimedia, video, and digitized photographs.

There is a general need for interchange compatibility among media and drives so that drives can read or write (if appropriate) any type of compact disk and any particular compact disk can be read or written (if appropriate) in any drive. However, general interchange compatibility is impeded by both physical obstacles and logical format obstacles. For an example of a physical obstacle, the maximum reflectance for rewritable media is about one-third the maximum reflectance for read-only and write-once media. As a result, drives capable of reading rewritable media must have a gain switch or automatic gain control in order to read all types of disks. CD-ROM drives are presently being designed (but not yet widely available) for reading rewritable media when it becomes widely available. Logical format obstacles result from a need to adapt to the needs and advantages of previously unforseen or unplanned applications (for example, rewritable media) while maintaining backward compatibility with previous formats.

Typically, a data mass memory medium is logically formatted into addressable units. For example, computer disks and data tapes typically have numbered sectors and numbered tracks. In addition, data mass memory typically includes overhead information including additional bits for error detection and correction, bits for synchronization of a clock before reading or writing, and unused space for accommodating variable speeds among drives. Typically, overhead information (including sector addresses, synchronization patterns and gaps) is written separately in a process called formatting. Typically, formatting must be completed before any variable data are written. Formatting often takes a substantial amount of time. Therefore, media such as flexible disks and tapes are often formatted by the manufacturer. This increases the cost of the media but is a great convenience to the customer. Sometimes, flexible disks and tapes may also be formatted or re-formatted in a drive. As will be explained in more detail below, formatting rewritable compact disks requires a significant amount of time and presents some unique challenges.

Before discussing compact disk formatting, some terminology definitions are required. All compact disks have a single spiral data track, starting near the center of the disk and ending near the edge of the disk. In the case of recordable and rewritable media, the spiral track is a physical groove. In the case of read-only media, the physical data track may be called a "groove" even though there is no physical groove. In addition to the physical track, data may be formatted into logical tracks. In this patent document, tracks will always be expressly identified as physical or logical. The physical track may be called a groove where appropriate.

In some compact disk formats, bytes are organized into frames and frames are organized into sectors, where a sector is the smallest addressable unit. In other formats, the terms sector, frame and block are somewhat interchangeable. In this patent document, a frame is the smallest addressable unit. A frame has 2,352 data bytes. Frame addresses are expressed in units of time and frame offset. A frame address is expressed as {M,S,F}, where M is minutes, S is seconds, and F is a frame offset within a second. There are 75 frames per second, 60 seconds per minute. An MSF address may be absolute (measured from the beginning of the physical track) or relative (measured from the beginning of the current logical track). Frames may be organized into packets. A packet has a link frame, four run-in frames, actual data frames, and four run-out frames. Recordable media has variable length packets. For rewritable media, the current format standard requires packets that are fixed length with 39 total frames per packet (32 actual data frames and 7 overhead frames). The number 39 is an arbitrary specification, and in this patent document, the term "packet aligned" is intended to include any standard number of frames per packet.

The format for CD-DA and CD-ROM media requires an area near the beginning of the physical track called a lead-in, followed by a program area. The program area is formatted into logical tracks. Finally, the format requires an area at the end of the last logical track called a lead-out. CD-DA and CD-ROM drives can seek to a specific logical track number. The lead-in area includes a table of contents (TOC), which includes a table of absolute MSF starting addresses for the logical tracks. The lead-in area also contains a pointer to the lead-out area. Many drives cannot calibrate radial position, and therefore cannot read a medium, unless both the lead-in and lead-out are present.

Recordable and rewritable media have a physical groove in which data are recorded. Read-only (CD-DA and CD-ROM) media do not have physical grooves but the spiral path of data pits and lands does provide a path that can be optically detected. For radial movement, many drives count the number of times a read head crosses the spiral data track for read-only media or the physical groove for recordable or rewritable media. Drives for recordable and rewritable media can always detect a physical groove but CD-DA and CD-ROM drives may not be adapted to detect physical grooves. For some drives, radial movement across the spiral physical track may be open loop without counting physical track crossings. Drives having open loop radial movement typically seek from the lead-in area to the lead-out area to calibrate the radial servo system. Therefore, for some drives, all frames between lead-in and lead-out must be formatted.

After formats were developed for CD-DA and CD-ROM, recordable (also called write-once) media (CD-R) were introduced. Of particular importance to CD-R recording is an ability to partially record a disk, and then later append new data. A single lead-in is not sufficient, since for write-once media the original lead-in cannot be modified when new data are added. Therefore, the technique of "sessions" was introduced, in which the physical track is formatted in multiple sessions with each session having a lead-in and a lead-out. Each disk may have up to 99 logical tracks across all sessions. Each lead-in except the last contains a pointer to the frame address of the next (possible) session. CD-ROM media formats and other formats may now be multi-session.

Still later, rewritable (also called erasable) media (CD-RW) were developed. With CD-RW, as with magnetic disks and tapes, there is need for generalized random access recording. However, backward compatibility needs to be maintained with single-session (e.g., CD-DA) and multi-session disk formats.

For tapes and disks, special formatting magnetic heads can be manufactured for simultaneously formatting many tracks and for formatting at a faster than normal track speed. However, for CD-RW media, writing each bit requires heat and a fixed cooling rate, which is inherently slow. Rewritable media uses a phase change material having a transparency that can be reversibly changed by heating, and then cooling at a controlled rate. A laser is used to heat, and then cool small areas at the required controlled rate. Formatting an entire CD-RW disk takes 40–80 minutes, whether done by the media manufacturer or in a drive. As a result, pre-formatted CD-RW media may be prohibitively expensive for the customer. However, keeping a customer's drive busy for 40–80 minutes to format a disk when the customer needs to immediately record data may also be commercially unacceptable. There is a general need for fast partial formatting of CD-RW media by a drive to accommodate quick initial useability and incremental recording.

There are many organizations involved with standards or defacto standards for CD media and formats, including ANSI, IEC, ISO, Philips and Sony. Of particular interest is Optical Storage Technology Association (OSTA), 311 East Carrillo Street, Santa Barbara, Calif. 93101. OSTA maintains an industry accepted file system standard called Universal Disk Format (UDF). UDF specifications permit incremental writing on a partially formatted CD-RW disk. In addition, OSTA, Philips, and Hewlett-Packard Company are jointly developing specifications for logical devices and physical requirements for drive manufacturers, computer manufacturers, and operating system software developers so that any operating system or drive can read all the following types of media: CD-DA, CD-ROM, CD-R, and CD-RW. Among other things, these specifications, called MultiRead, specify drive requirements to accommodate the reflectivity of CD-RW media.

FIGS. 1A–1C and FIG. 2 illustrate the UDF specified process for incremental formatting and writing. FIGS. 1A–1C depict the formatted areas on the physical track of the disk. FIG. 2 is a flow chart of the method of incremental formatting depicted in FIGS. 1A–1C. In FIG. 1A, a physical track has been partially formatted, with a lead-in area 100, a program area 102 and a lead-out area 104. When the capacity of the program area 102 is exceeded, the host computer commands the drive to extend the formatted area as illustrated in FIG. 1B. Note, in general in this patent document, formatting can be accomplished by either an explicit format command or implied by a write command. New frames 108 are formatted with null data, where null data may be zeros or any other arbitrary value, starting at the location of the old lead-out area (104). The old lead-in area 100 is updated (overwritten or optionally erased and overwritten) to provide a new lead-in area 106 and a new lead-out area 110 is appended. After incremental formatting, in FIG. 1C, the new data 112 are written in the newly formatted frames.

In FIG. 2, a host computer first sends a command (200) to an idle drive (202) to partially format a blank disk. In step 204, the drive partially formats a disk with lead-in, program, and lead-out as depicted in FIG. 1A. Next, after detecting that the disk cannot hold new data that the host needs to write, the host computer (using UDF) sends a command (206) to incrementally format additional space. The additional space may optionally be greater than what is required to write the new data. The drive then formats new frames with null (arbitrary) data (208), writes new lead-in and lead-out areas (210). The host computer then sends the new data (212) and the drive writes new data in the newly formatted frames (214). As a result, each time the disk space needs to be expanded, in addition to simply writing the new data, a substantial amount of overhead time is required for formatting frames with null (arbitrary) data and rewriting the lead-in and lead-out areas.

There is a need for faster partial formatting, faster incremental recording, and improved customer convenience for CD-RW disks, preferably with minimal changes to drives, operating system software, and interchange standards.

SUMMARY OF THE INVENTION

Five embodiments are provided, each of which decreases the time required to write initial data to a disk or decreases the time required to append new data to the disk. In several of the embodiments, the drive performs some formatting as an off-line process, either autonomously or under command from a host computer.

In a first example embodiment, a preliminary area is formatted as in figure 1A, and then additional frames beyond the lead-out area are formatted automatically by the drive as an off-line process. When the original program area needs to be extended, the old lead-out area is overwritten, a new lead-out area is appended, and the old lead-in area is rewritten.

In a second example embodiment, a preliminary area is formatted as in FIG. 1A, and then a second session is formatted automatically by the drive as an off-line process.

In a third example embodiment, the disk is initially partially formatted but without a lead-in area and without a lead-out area. Additional frames may optionally be formatted automatically by the drive as an off-line process. Lead-in and lead-out areas are added only when the disk is full or when interchange with read-only drives is required.

In a fourth example embodiment, the disk is not formatted before new data is written, Instead, the first time new data is requested, the lead-in area is written to match the requirements of the new data, the program area is written with the new data, additional frames may be optionally formatted, and a lead-out area is written. When the program area needs to be extended, the old lead-in area is overwritten by new data, and a new lead-out area is appended.

In a fifth example embodiment, the disk is initially partially formatted with only a lead-in area and a lead-out area, with the lead-out area at the end of the physical track. When new data is written, frames are written with the new data. Additional frames may optionally be formatted with null (arbitrary) data automatically by the drive as an off-line process.

BRIEF DESCRIPTION OF THE DRAWINGS

FIGS. 1A, 1B, and 1C are prior art block diagrams illustrating formatted areas on the physical track of a disk when a standard process is used for appending new data.

FIGS. 5A and 5B are block diagrams illustrating formatted areas on the physical track of a disk for a second example process for incremental formatting and appending new data in accordance with the invention.

FIGS. 7A, 7B and 7C are block diagrams illustrating formatted areas on the physical track of a disk for a third example process for incremental formatting and appending new data in accordance with the invention.

FIGS. 11A and 11B are block diagrams illustrating formatted areas on the physical track of a disk for a fifth example process for incremental formatting and appending new data in accordance with the invention.

DETAILED DESCRIPTION OF THE PREFERRED EMBODIMENT OF THE INVENTION

Figure 3A:
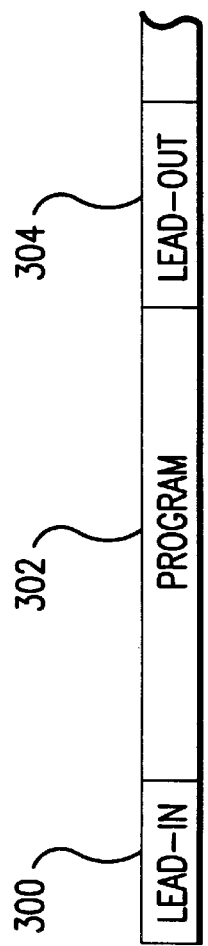
FIGS. 3A, 3B and 3C are block diagrams illustrating formatted areas on the physical track of a disk for a first example process for incremental formatting and appending new data in accordance with the invention.
Figure 3B:
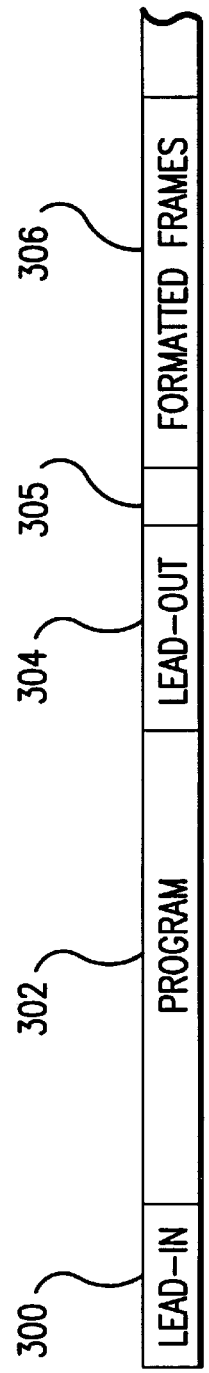
Figure 3C:
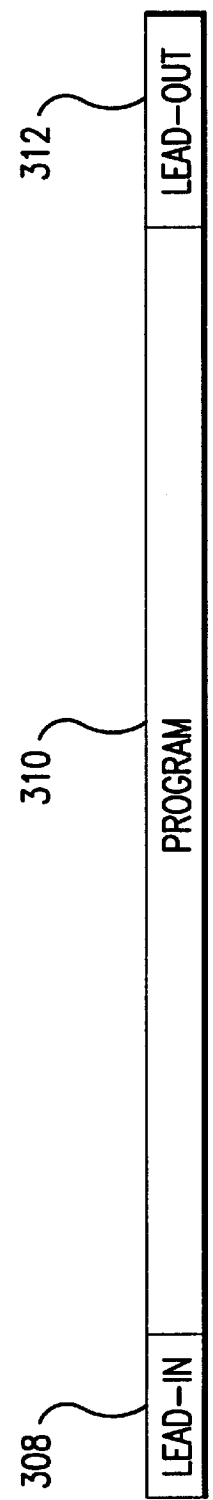
Figure 4:
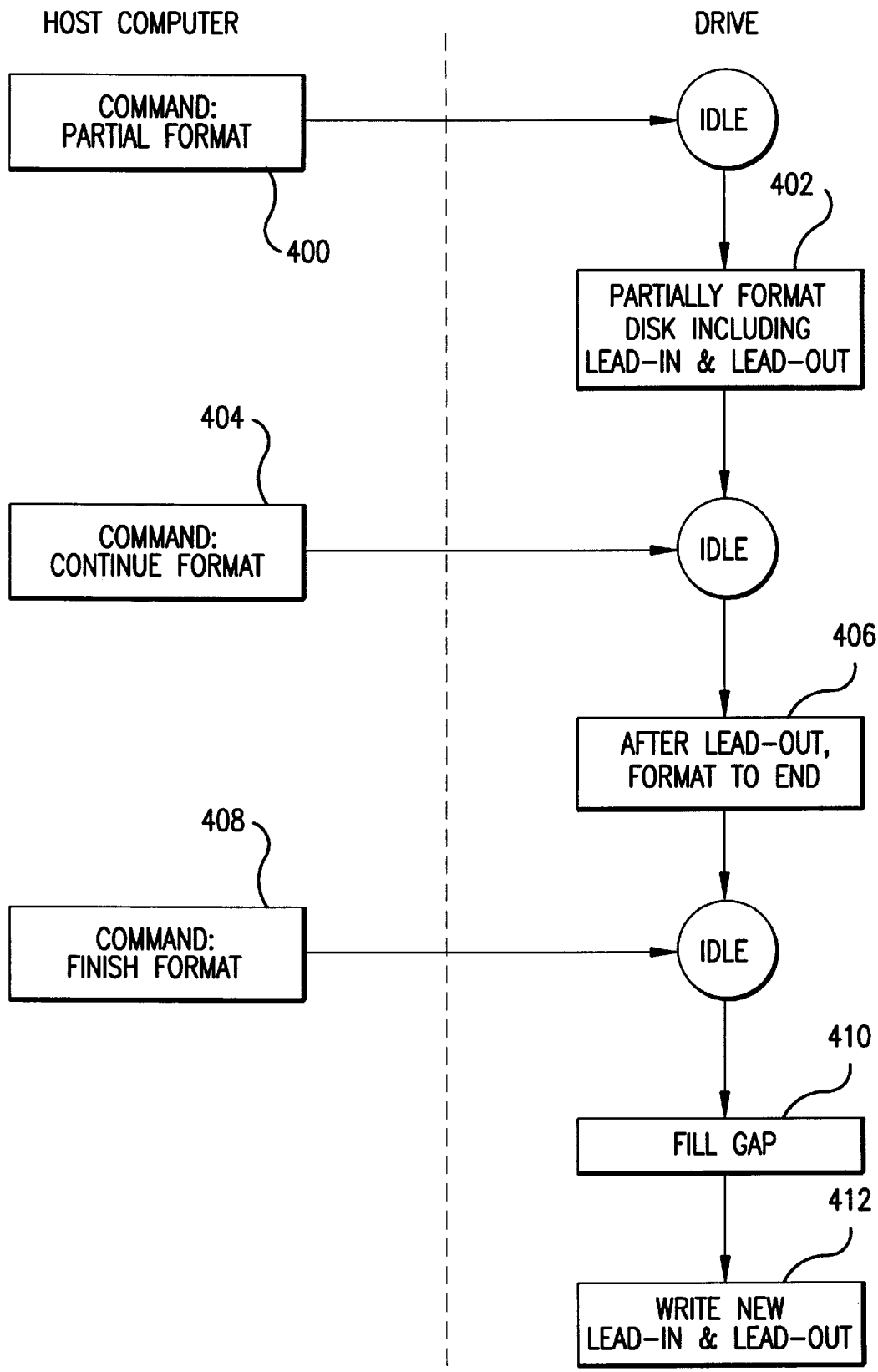
FIG. 4 is a flow chart for incremental formatting and appending new data as illustrated in FIGS. 3A–3C.

FIGS. 3A, 3B and 3C illustrate formatted areas on the physical track of a disk for a first example incremental formatting process in accordance with the invention. FIG. 4 is a flow chart of a process for incremental formatting and adding new data as in FIGS. 3A–3C. In FIG. 3A, starting with a blank disk, a drive initially partially formats a disk with a lead-in area (300), a relatively short program area (302) and a lead-out area (304). Then, in FIG. 3B, the drive formats additional frames beyond the lead-out area. This off-line process is interruptible if the drive is need by the host computer or if the operator needs to eject the disk. In FIG. 3B, when additional frames are written beyond the lead-out area 304, the gap 305 between the existing lead-out area (304) and the new formatted frames (306) is used to align the following fixed length packets (an integral multiple of 39 frames for present UDF standards) with fixed length packets previously written. The new formatted frames (306) are not usable until the lead-out area 304 and the gap 305 are overwritten with fixed length packets. The gap may be zero length. The gap may be padded with arbitrary data. Finally, when the entire track has been filled with formatted frames, the host may command the drive to initiate an additional off-line process, to overwrite the old lead-out area (304) and fill the gap 305 with new null data frames, resulting in a new program area 310, and then to write a new lead-in area 308 and a new lead-out area 312. Note that the order is arbitrary for writing a new lead-in area (300), writing a new-lead out area (304), and filling the gap.

In FIG. 4, when a host computer commands a partial format (400), the drive partially formats the disk with lead-in and lead-out areas (402). Under host computer command (404), the drive formats additional frames to the end of the physical track (406). This process is interruptible if the customer or host computer needs to use the drive. Finally, under host command (408), the drive fills in the gap between the old program area and the new formatted frames (412) and then to write new lead-in and lead-out areas (414).

In the method of FIG. 4, before off-line formatting, the disk is available for immediate data writing with reduced capacity. Comparing FIGS. 2 and 4, the method of FIG. 4 eliminates steps 208 and 210 of FIG. 2, reducing the time required for incremental data recording after the initial formatting. After off-line formatting of the remainder of the disk, the entire disk is available for immediate data writing. This has the advantage of fast initial useability (partial formatting) with interruptible off-line formatting to prevent forcing the customer to wait 40–80 minutes for a full one-pass formatting operation. The method of FIG. 4 requires drive firmware changes. However, in contrast to later example embodiments, in the method of FIG. 4 the disk is always in a standard format.

Figure 6:
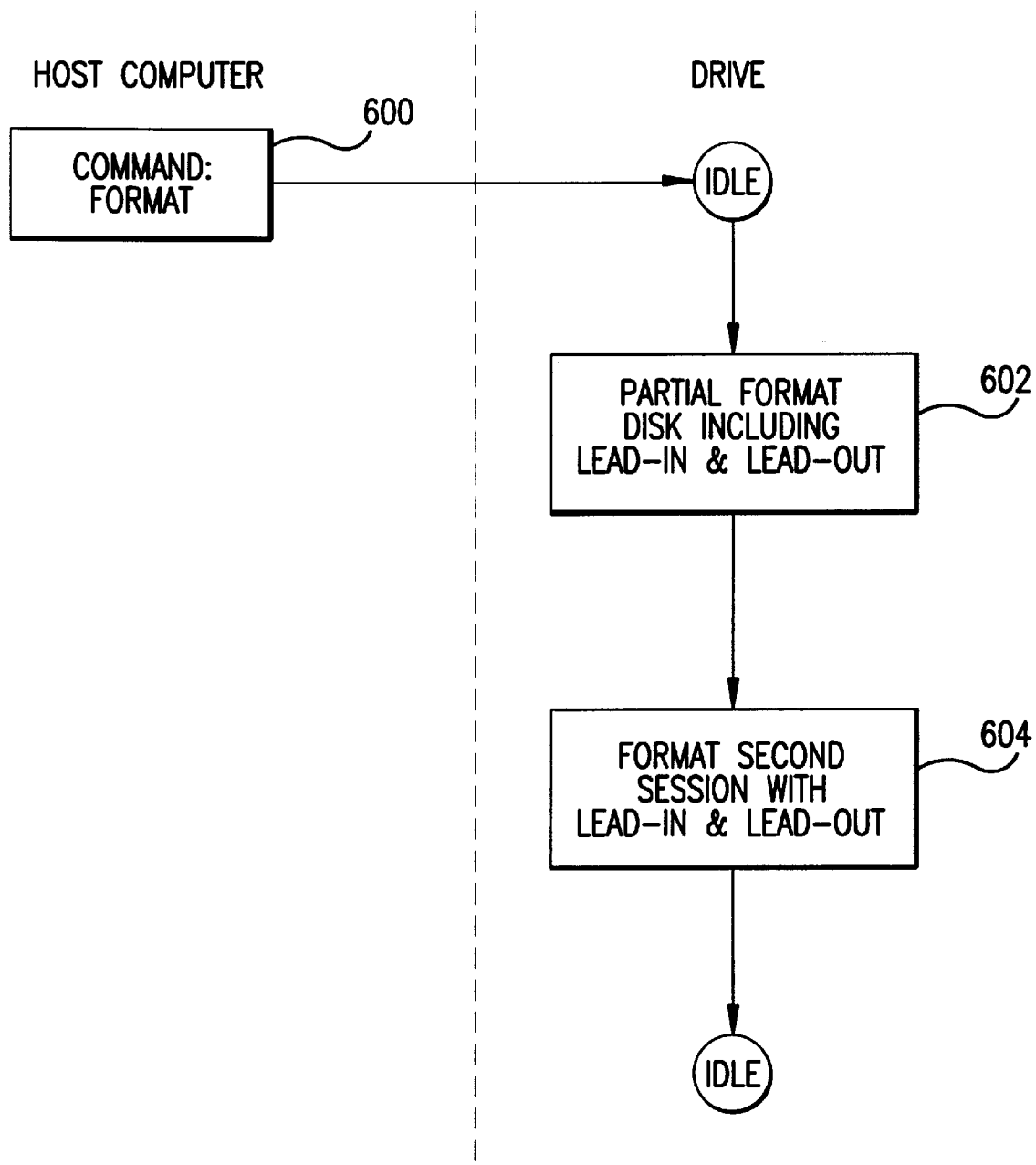
FIG. 6 is a flow chart for incremental formatting and appending new data as illustrated in FIGS. 5A and 5B.

FIGS. 5A and 5B illustrate formatted areas on the physical track of a disk for a second example incremental formatting process in accordance with the invention. FIG. 6 is a flow chart of a process for incremental formatting and adding new data as in FIGS. 5A and 5B. In FIG. 5A, starting with a blank disk, a drive initially partially formats a disk with a lead-in area (500), a relatively short program area (502) and a lead-out area (504). Then, either under command from the host computer or autonomously, the drive formats a second session in an off-line process. The second session requires an additional lead-in area 506, an additional program area 508, and an additional lead-out area 510. A single second session may fill the remainder of the track beyond the original lead-out area (504), or multiple shorter sessions may be provided.

In FIG. 6, when a host computer commands a partial format (600), the drive partially formats the disk with lead-in and lead-out areas (602). Under host computer command, or autonomously, the drive formats an additional session (604) in an off-line process, including a new lead-in area and a new lead-out area. This process is interruptible if the customer or host computer needs to use the drive.

In the method of FIG. 6, before off-line formatting, the disk is available for immediate data writing with reduced capacity. Comparing FIG. 6 to FIG. 2, the method of FIG. 6 eliminates steps 208 and 210 of FIG. 2, reducing the time required for incremental data recording after the initial formatting. After off-line formatting of the remainder of the disk, the entire disk is available for immediate data writing. This has the advantage of fast initial useability (partial formatting) with interruptible off-line formatting to prevent forcing the customer to wait 40–80 minutes for a full one-pass formatting operation.

The method of FIG. 6 has the disadvantage that many read-only drives do not support multiple sessions. If the method of FIG. 6 is implemented for CD-RW drives, MultiRead specifications will need to require CD-ROM drives to support multiple sessions.

Lead-in and lead-out areas are a historical hold-over from the original audio disk needs. These areas provide read-only drives with an ability to determine the starting location and playing time of each logical track, and are used by some drives for radial servo calibration. For CD-R and CD-RW drives, a Program Memory Area (PMA) used for writing contains a superset of the information contained in the lead-in area and the lead-out area. However, read-only drives such as CD-DA and CD-ROM drives cannot read the PMA so lead-in and lead-out are required for compatibility across all types of drives.

FIGS. 7A–7C illustrate formatted areas on the physical track of a disk for a third example incremental formatting process in accordance with the invention.

Figure 8:
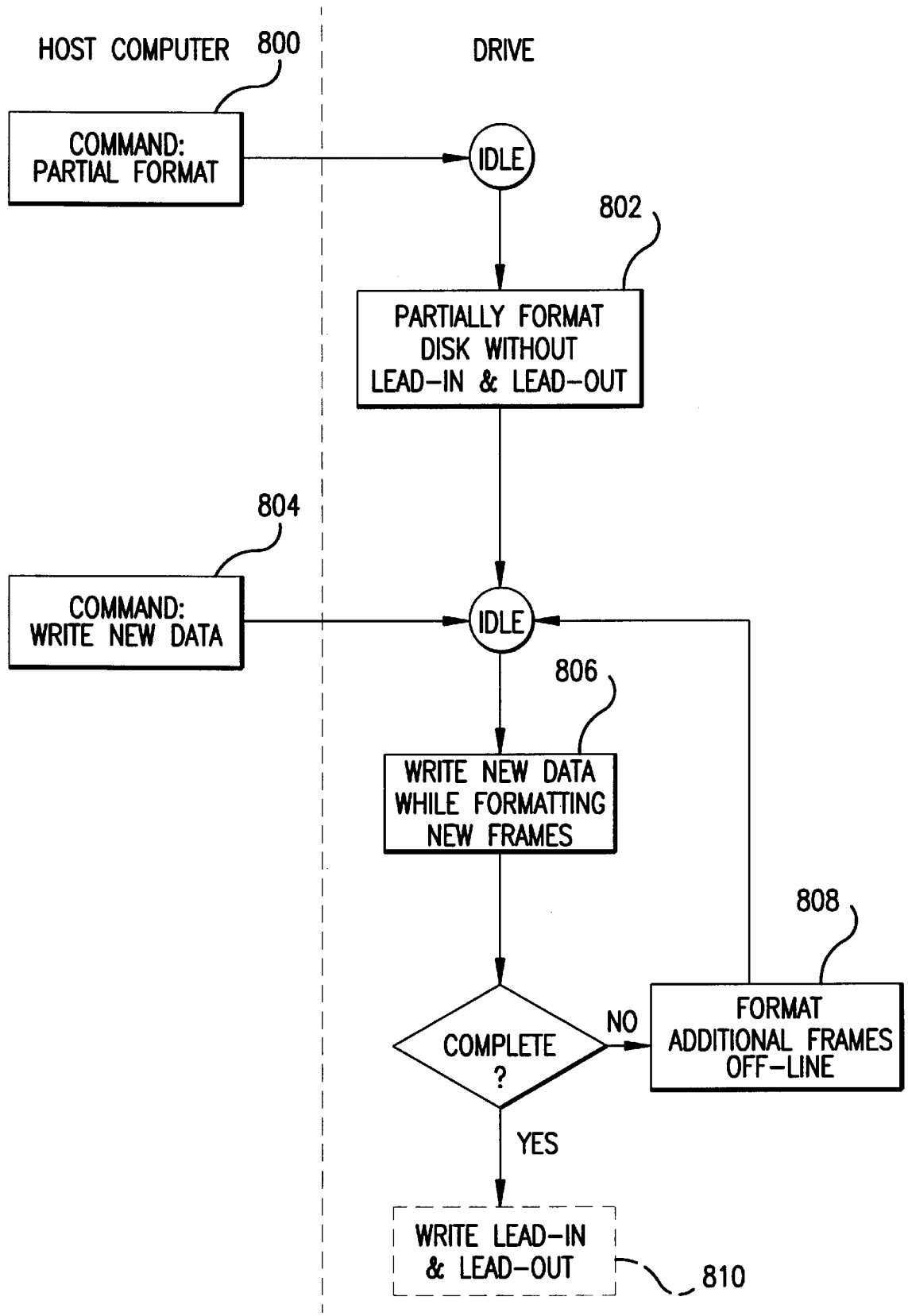
FIG. 8 is a flow chart for incremental formatting and appending new data as illustrated in FIGS. 7A–7C.

FIG. 8 is a flow chart of a process for incremental formatting and adding new data as in FIGS. 7A–7C. First, in FIG. 7A, for a blank disk, only a limited program area 700 is formatted, with no lead-in area or lead-out area. Then, in FIG. 7B, the drive incrementally formats new frames 702. This incremental off-line formatting is interruptible. There are two options for formatting the new frames 702. If new data exceeding the capacity of the existing program area 700 are available, then new frames 702 can be formatted with new data. If no new data are available, then while the drive is off-line and not being used by the host computer, the drive automatically (or optionally under host command) adds frames with null (arbitrary) data such as zeros. Finally, in FIG. 7C, a lead-in area 704 and a lead-out area 708 may be written as an optional step under host command, necessary only if required to ensure interchange or if required by a particular data format. Alternatively, the lead-in area 704 and the lead-out area 708 may be added as an automatic last step when the disk is completely formatted.

In FIG. 8, when a host computer commands a formatting operation (800), the drive formats a relatively small program area (802) with no lead-in and no lead-out. When the host computer commands data writing (804) that exceeds the capacity of the formatted program area, the drive formats new frames with the new data (806). If the disk is completely formatted, or if commanded by the host computer, lead-in and lead-out areas may optionally be added (810). In addition, if the disk is not completely formatted, the drive formats new frames (808) with arbitrary (null) data.

Figure 2:
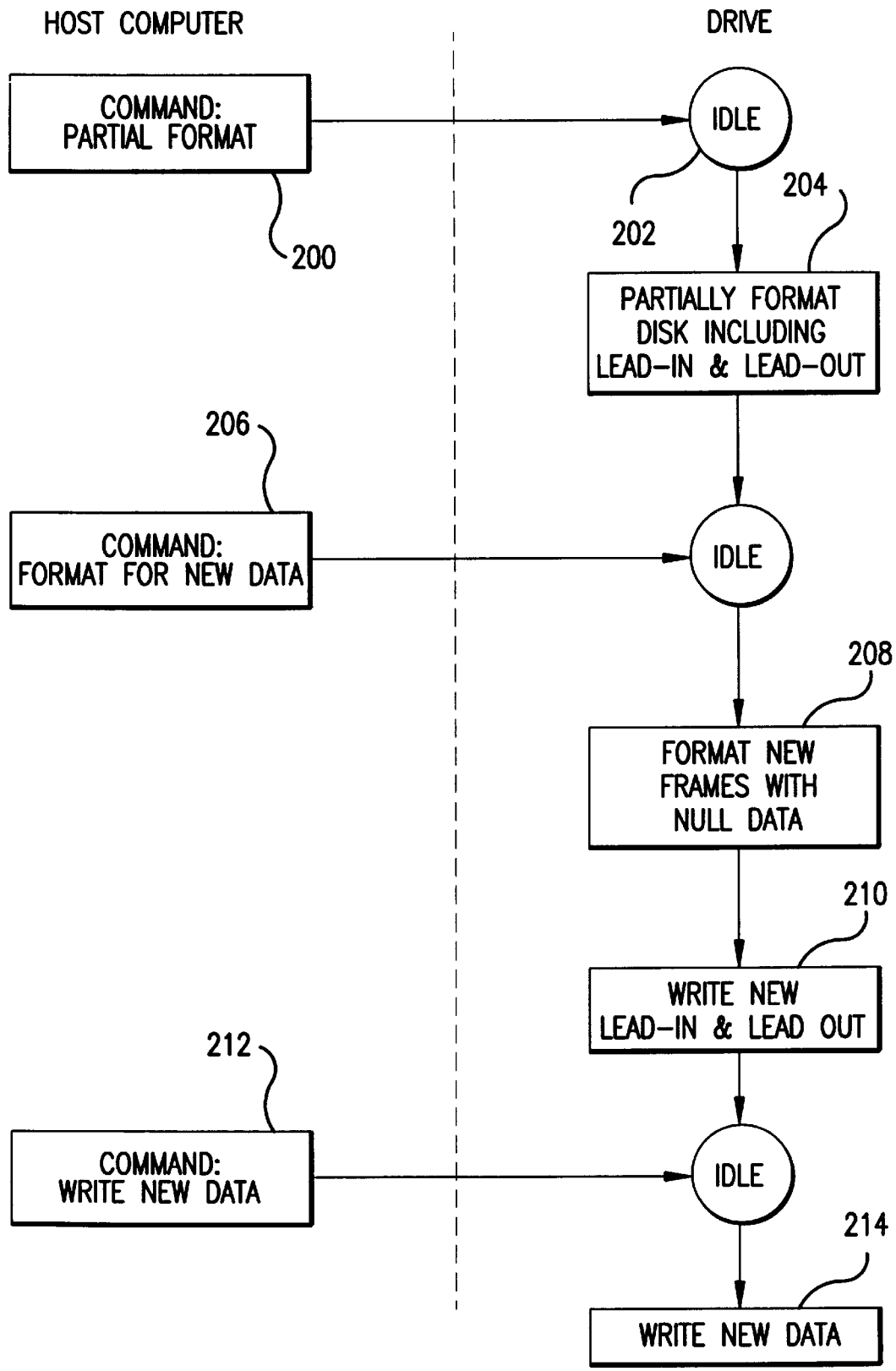
FIG. 2 is a flow chart of a standard (prior art) method for appending new data as illustrated in figures 1A–1C.

Comparing FIGS. 2 and 8, the method of FIG. 8 eliminates steps 208 and 210 of FIG. 2 for all new data write requests except for one final request to write lead-in and lead-out. Therefore, the time for incremental writing is substantially reduced. However, there are some disadvantages. Until lead-in and lead-out areas are written, the disk can only be read in drives capable of writing rewritable disks. That is, the disk may be non-standard, depending on future standards specifications.

Figure 9A:
FIGS. 9A, 9B and 9C are block diagrams illustrating formatted areas on the physical track of a disk for a fourth example process for incremental formatting and appending new data in accordance with the invention.
Figure 9B:
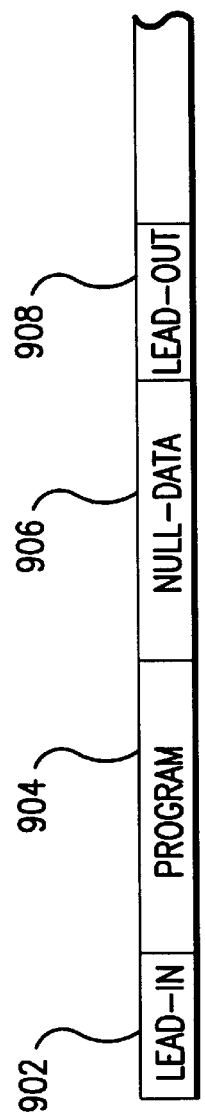
Figure 9C:
Figure 10:
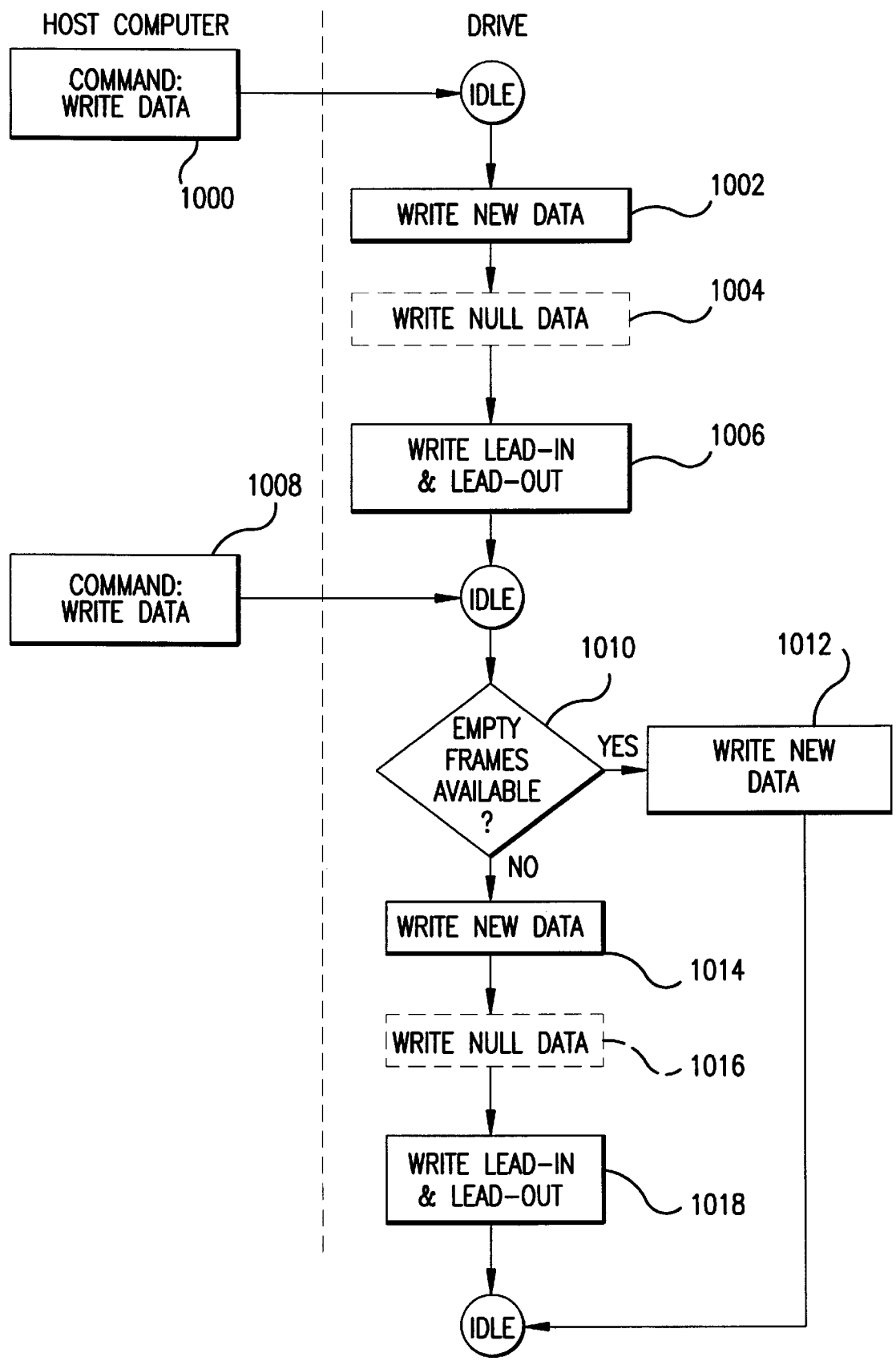
FIG. 10 is a flow chart for incremental formatting and appending new data as illustrated in FIGS. 9A–9C.

FIGS. 9A, 9B and 9C illustrate formatted areas on the physical track of a disk for a fourth example incremental formatting process in accordance with the invention. FIG. 10 is a flow chart of a process for incremental formatting and adding new data as in FIGS. 9A–9C. In FIG. 9A, a disk is blank with an unformatted track 900. In general, when any mass memory medium is formatted, a data pattern is written in the data areas. If the ultimate data for recording are not known at the time of formatting, a null (arbitrary) pattern is written, for example, repeated binary zeros. If the ultimate data for recording are known at the time of formatting, then data recording and formatting can occur simultaneously. In FIG. 9B, when a command is received to write data, the drive writes a program area 904 using the new data instead of null data, optionally formats additional frames 906 with null data, and then writes a lead-in area 902 and a lead-out area 908. In FIG. 9C, when a command is received to write additional data extending beyond already formatted frames, the old lead-in 902 is rewritten to from a new lead-in 910, the old lead-out area 908 is overwritten with new data frames, additional frames 914 are optionally formatted with null data, and a new lead-out area 916 is appended.

In FIG. 10, a host computer sends a command 1000 to write data. The drive writes (1002) a program area using the new data instead of null data, optionally formats additional frames with null data (1004) and writes a lead-in area and a lead-out area (1006). When a host computer sends a command 1008 for still more data, if there are empty formatted frames available from step 1004, new data is written (1012) in the empty frames. If empty frames are not available, the new data is written over the old lead-out area (1014), additional frames are optionally formatted (1016) with null data, and a new lead-in area and lead-out area are written (1018).

Note that the method of FIG. 10, steps 1002 and 1006 are essentially what is required for a write-once medium. However, in a write-once medium, by definition, the lead-in area can only be written once. A rewritable medium enables incremental formatting and writing as illustrated in FIG. 10. For a rewritable medium, in general, the lead-in area can be rewritten before new data is written (for example, in FIG. 10, the lead-in area can be written in steps 1002 and 1014) but it may be more practical or simple to rewrite the lead-in area after new data is written along with writing the lead-out area.

Comparing FIG. 10 and FIG. 2, the method of FIG. 10 eliminates steps 204 and 208 of FIG. 2, reducing the time required for initial data recording and the time required for incremental recording.

Figure 12:
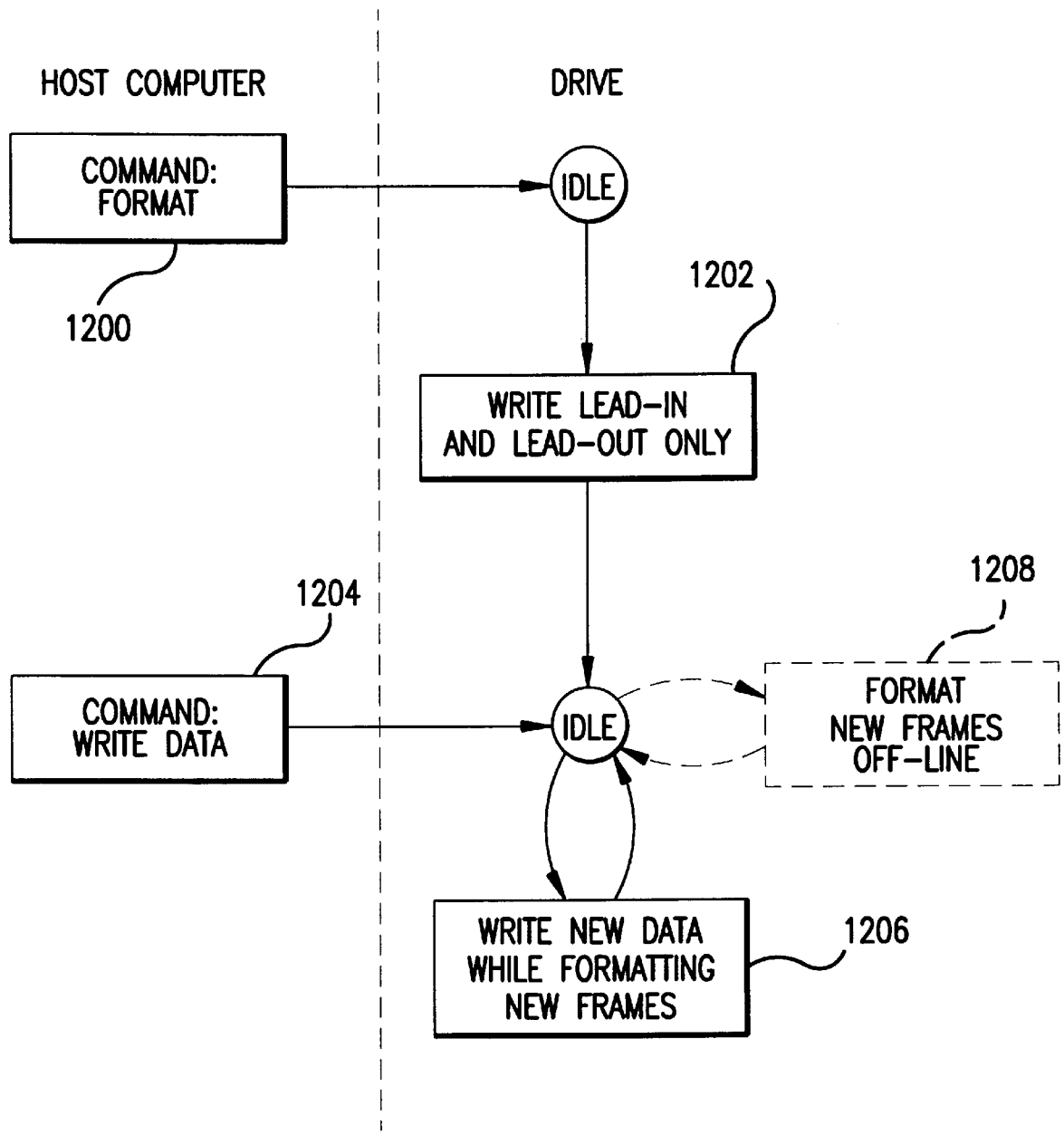
FIG. 12 is a flow chart for incremental formatting and appending new data as illustrated in FIGS. 11A and 11B.

FIGS. 11A and 11B illustrate formatted areas on the physical track of a disk for a fifth example incremental formatting process in accordance with the invention. FIG. 12 is a flow chart of a process for incremental formatting and adding new data as in FIGS. 11A and 11B. In FIG. 11A, a disk is initially formatted with just a lead-in area 1100 and a lead-out area 1102. There is no formatted program area initially. In FIG. 11B, when new data 1104 are written, the new data are written simultaneously with formatting new frames. Optionally, the drive may write additional frames 1106 using null data as an automatic off-line process.

In FIG. 12, when a host computer commands the drive to format a medium (1200), the drive simply writes lead-in and lead-out areas (1202). Then, when the host computer commands the drive to write new data, new data are written while formatting new frames (1206). Optionally, the drive may format new frames with arbitrary (null) data as an automatic off-line process (1208).

Clearly, the method of FIG. 12 results in the fastest possible preformatting and incremental recording. The primary disadvantage is that unformatted areas of the physical track are present before the lead-out area. As discussed above, some CD-ROM drives seek from the lead-in area to the lead-out area for calibration. If a portion of the area between lead-in and lead-out has never been formatted, the seek may fail and the radial positioning servo may fail to track. One solution is to provide for graceful recovery if an unformatted area is detected. For example, if an unformatted area is detected, the drive could start at the last valid data frame and go radially inward to the lead-in area for radial calibration. That is, radial calibration may be performed between the innermost formatted radius and the outermost formatted radius. An alternative solution is to provide CD-ROM drives with the ability to count physical groove crossings or the ability to follow a physical groove. CD-R and CD-RW media have a physical groove that includes time (and therefore address) information.

The foregoing description of the present invention has been presented for purposes of illustration and description.

It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of formatting a rewritable optical disk, the method comprising the following steps:

(a) writing, over less than the entire disk, a lead-in area, a program area, and a first lead-out area;

(b) writing, as an off-line process, new frames beyond the first lead-out area such that these frames are packet aligned with the program area written in step (a);

(c) writing, as an off-line process, a new lead-out area;

(d) writing, as an off-line process, from the program area, over the first lead-out area, to the new frames such that the program area in step (a) and the new frames in step (b) form one new contiguous program area; and (e) writing, as an off-line process, a new lead-in area.

2. The method of claim 1 wherein the step of writing a new lead-out area, step (c), occurs after the step of writing a new lead-in area, step (e).

* * * * *